United States Patent Office 3,354,132
Patented Nov. 21, 1967

3,354,132
POLYMERIZATION OF BICYCLIC MONOTER-
PENES WITH AN ALKYL TIN HALIDE-ALU-
MINUM CHLORIDE CATALYST
Alan D. Sproat, Verona, Pa., assignor to Pennsylvania Industrial Chemical Corporation, Clairton, Pa., a corporation of Pennsylvania
No Drawing. Filed Sept. 2, 1964, Ser. No. 394,034
15 Claims. (Cl. 260—88.2)

This invention relates to polymers of bicyclic monoterpenes, such as alpha pinene and beta pinene, mixtures thereof, such as turpentine, and to polymers of other unsaturated cyclic hydrocarbons, such as dipentene.

Beta pinene resins have been made and used on a very large scale for many years because they exhibit a combination of desirable properties. For example, they exhibit high solubility in hydrocarbon solvents such as are used in the manufacture of paints, adhesives and varnishes, they are compatible with a wide variety of waxes, oils, bituminous materials and other resinous substances such as rosin, ester gums, coumarone-indene resins, and various others. A particularly advantageous property is that of relatively high softening point, for instance 125° to 135° C. (ring and ball). Also, they can be produced of color range from 2 to 5 on the Gardner scale. Such properties adapt the beta pinene resins to a wide variety of uses including not only the manufacture of paints and varnishes but also for the compounding of rubber and rubber tile compositions, paper coating compositions, printing inks, pressure sensitive adhesives, and a variety of other uses.

Beta pinene is produced chiefly by the distillation of turpentine, the alpha pinene content of which remains as a material that has had no particular utility as a monomer for resin manufacture down to the present time because the polymerization systems applied to it have not resulted in resins of the desired high melting point, and yield.

The primary object of the present invention is to provide a method of catalytically polymerizing alpha pinene to produce high yields of resin of good color and of much higher melting point than has been attained with previous attempts to polymerize this terpene, as by aluminum chloride or other Friedel-Crafts catalysts, which is simple, easily practiced with standard equipment, makes use of commercially available catalytic materials, and does not require technically trained operators.

A further object is to provide a method that is applicable to the polymerization of other unsaturated cyclic hydrocarbons such, for example, as bicyclic monoterpenes (e.g. beta pinene), turpentine, dipentene and vinyl cyclohexene whereby to produce good yields of resins of melting points adequate for commercial purposes and of lower chlorine content than results from polymerization of these compounds with aluminum chloride, and in which the objectionable sludging that is encountered when these compounds are polymerized with aluminum chloride is minimized.

Yet another object is to provide a co-catalyst system for the practice of the methods of this invention.

A further object is to provide alpha pinene polymers of at least 110° C. softening point, of relatively high molecular weight, and which are not only similar to beta pinene polymers in solubility characteristics but also exhibit solubility characteristics different from those of beta pinene polymers.

Still another object is to provide a method of continuously practicing the methods of the foregoing objects.

Another object is to provide an alpha pinene resin of higher softening point and molecular weight than has been available prior to my invention and which is much more useful for commercial purposes than prior alpha pinene resins.

Other objects will appear hereinafter.

The invention is predicated upon my discovery that its stated objects are attained with co-catalysts of (1) a lower alkyl tin halide and (2) aluminum chloride. Preferably, butyl tin chlorides are used although other alkyl radicals of up to 20 carbon atoms may be used in place of butyl.

In the preferred practice of the invention there is first prepared a solution of the co-catalyst in an inert solvent, and the alpha pinene is then added incrementally with vigorous stirring while maintaining the reaction body at from about minus 20° to plus 50° C. to insure maximum yield of resin of maximum softening point. After the alpha pinene has been added stirring and cooling are continued for a period of time, at least 15 minutes, following which the catalyst is quenched with water with production of an oily phase and an aqueous phase. The alpha pinene polymer resin is then recovered by standard practices from the oily phase. The process may be continuous as pointed out hereinafter.

As solvents, or diluents, aromatic hydrocarbons are preferably used, e.g., xylene, diethyl benzenes, Solvesso 100 (98% aromatics, 0.876 sp. gr., 116° F. closed cup flash point, 321° F. initial boiling point, 50% off at 328° F., 349° end point). Other solvents that might be used are saturated alkanes and cycloalkanes and halogenated hydrocarbons.

Although the alkyl tin trihalides ($RSnCl_3$) or the trialkyl monohalides ($R_3SnCl$) may be used, with results better than to be had with aluminum chloride alone, preferably the alkyl tin dichlorides ($R_2SnCl_2$) are used, and particularly dibutyl tin dichloride (DBTD). For the purposes of the invention those compounds, which are commercially available, may be used together with aluminum chloride; however, the co-catalysts of this invention may be prepared in the reaction solvent from an aluminum trialkyl and tin tetrachloride by procedures known in the art, in which event the two react to produce in situ the alkyl tin halide and aluminum chloride. In forming the co-catalysts in situ care must be observed, of course, in view of the known great reactivity and hazardous nature of the aluminum trialkyls.

The ratio of the alkyl tin halide to aluminum chloride may vary within wide limits. However, at constant catalyst level based upon the amount of alpha pinene used, the yield of resin is increased as the ratio of the alkyl radical to aluminum is increased. The ratio of the dichloride to $AlCl_3$ should be greater than about 1:30 by weight. Preferably, a weight ratio of 1 part by weight of DBTD to 5 parts by weight of aluminum chloride is used. Optimum ratios for other alkyl tin chlorides as well as for the trialkyl and the monoalkylchlorides are readily determined as those familiar with the art will understand.

In general, small amounts of these catalysts relative to the amount of alpha pinene monomer suffice, and here again the optimum ratios are readily determined by simple trail runs. In the case of DBTD I have found that when the butyl to aluminum ratio is 1:5 an amount equivalent to 6 percent by weight of the monomer generally provides optimum results. Five weight percent of catalyst may, in general, result in somewhat lower yields of resin, while the use of 7 percent or more by weight of the catalysts exerts no gross effect on the product.

An important and critical feature of the invention in the production of the high yields of high softening point resin which characterize the invention is to supply the reactants and the solvent in thoroughly dried condition and in the case of alpha pinene and turpentine to exclude its oxidation products from the reaction system during polymerization because alpha pinene and turpentine are reactive with oxygen so that its presence in other than extremely minute amounts results in decreased yields and lower softening point. According to my investigations the alpha pinene and the solvent used should contain a total of not more than 50 parts per million (p.p.m.) of water. Greater amounts of water result in decreased yields and resin of lower softening point.

Reduction of the water content of the alpha pinene and the solvents is accomplished readily by drying them over molecular sieves, suitably Linde 3A. As a further precaution to avoid the objectionable effect of moisture, the reaction vessel and associated equipment should be well dried immediately prior to use, as by heating to, for example, 150° C.

In the preferred practice of the invention, then, the alpha pinene and the solvent are appropriately dried, for instance in the manner just indicated, the reaction vessel and associated parts to which the catalyst and the alpha pinene are exposed, is likewise dried, and a current of inert gas, suitably dry nitrogen, is started through the system. The solvent and catalyst are introduced into the vessel and alpha pinene is then added incrementally and progressively, for instance in dropwise fashion, while vigorously stirring the reaction body. As soon as the alpha pinene is added a strong exotherm occurs and cooling is initiated to maintain the reaction body by appropriate means at −20° C. to +50° C. but preferably at about 20° to 25° C. Stirring and temperature control are continued for a period of time after all of the alpha pinene has been added. In general 15 minutes to two hours suffices for the latter purpose.

At the end of this time the reaction body is quenched to hydrolyze the catalyst, as by adding a volume of water equal to the volume of alpha pinene used. If preferred, there may be used a dilute solution of an alkali, e.g. potassium hydroxide, instead of water. This results in the formation of an oil phase and an aqueous phase. These are separated and the oily hydrocarbon layer is washed repeatedly with equal amounts of water.

After the final water wash the hydrocarbon phase is charged to a suitable still and an inert gas, suitably nitrogen, is bubbled through the liquid while bringing the temperature up to about 210° C. until all of the solvent has been removed.

At this point dry steam is substituted in place of the inert gas and the temperature raised to 240° C. and steaming is continued until the steam condensate to oil ratio is about 20:1, when the resin is recovered and dried.

The alpha pinene monomer should be of quite high purity, in fact, the purer the pinene the better the economy of the operation. Alpha pinene of 85 percent purity is commercially available and will give satisfactory results. A product of higher purity is preferably used, however, such as that sold as Acintene A (available from the Arizona Chemical Company). This material analyzes by gas chromatography 95 percent of alpha pinene, 3.9 percent of camphene, and 1.1 percent of beta pinene. It is normal for the alpha pinene commercially available to contain small amounts of both camphene and beta pinene but this is not objectionable for the beta pinene is polymerized to resin of high softening point, and the camphene does not hinder the polymerization or exert any deleterious effect upon the properties of the resin.

As an example of the practice of the invention, Acintene A and Solvesso 100 were dried to 10 p.p.m. water over molecular sieves. A glass three-neck flask, glass separatory funnel and a stainless steel stirrer were dried in an oven at 150° C. When the equipment was assembled a stream of dry nitrogen was passed through the flask and maintained during the duration of the run. Sixty-seven grams of the dried Solvesso 100 were charged to the flask and there were added 5 grams of $AlCl_3$ and one gram of DBTD, providing a ratio of 5:1. The catalyst solution was agitated by operation of the stirrer, 100 grams of the dried Acintene A were added dropwise from the separatory funnel. The temperature of the reaction body was held at 20° to 25° C. by a Dry Ice-alcohol bath during the 6 to 10 minutes it took to introduce the alpha pinene. Thereafter the contents of the flask were maintained at temperature for two hours while passing the nitrogen stream through it. At the end of that time there was added water equal in volume to the alpha pinene used. The resultant phases were separated, and the hydrocarbon phase was washed three times with equal amounts of water. It was then charged to a flask provided with a thermometer and a bubbler tube and nitrogen was bubbled through the liquid while bringing the temperature up to 210° C. At that point the introduction of gas was discontinued and in its place dry steam was passed in until the temperature reached 230° to 240° C. Steaming was continued until the ratio of condensate to oil reached 20:1. The resin was separated from the condensate. The results of this run were:

| | | |
|---|---|---|
| Resin yield | percent by weight | 72.5 |
| Softening point—ring and ball | ° C | 125 |
| Color | G | 5 |
| Cl | Approx. p.p.m. | 125 |
| Oil yield | Percent by weight | 20 |

With all conditions in the procedure as in the example just given excepting the ratio of aluminum chloride to DBTD the following results were obtained:

1. *10:1   (5.5 g. $AlCl_3$:0.55 g. DBTD)*

| | | |
|---|---|---|
| Resin yield | Percent | 66.0 |
| Oil yield | do | 24 |
| Softening point | ° C | 128 |

2. *20:1   (5.7 g. $AlCl_3$:0.28 g. DBTD)*

| | | |
|---|---|---|
| Resin yield | Percent | 64.0 |
| Oil yield | do | 27 |
| Softening point | ° C | 118 |

Typically, alpha pinene polymers prepared in this way will have a molecular weight of 700 to 800 (cryoscopic), a bromine number of about 15 to 25, and a softening point of at least about 110° C.

These polymers are soluble in all solvents for beta pinene polymers, such as hexane, benzene, heptane, toluene, xylene and mineral spirits. However, they differ from the beta pinene polymers in exhibiting solubility in methyl ethyl ketone, dioxane ethyl acetate and cyclohexanol. They differ likewise in lower melt viscosity and natural rubber requires less milling in making pressure sensitive tapes.

Prior proposals for the making of alpha pinene polymers generally involved polymerization with aluminum chloride. The resultant reaction body was stripped to obtain resin of, for example, 80° C. The yield was so low as to be wholly uneconomical; if the stripping was to a lesser extent (to increase yield) the softening point was so low (e.g., so soft that a ball and ring determination could not be made at room temperature) as to be unsuited to commercial use. As far as I am aware, prior to my invention no alpha pinene resin had been used commercially.

In further illustration of the invention, reference may be made to the following table.

AlCl₃-TIN ALKYL HALIDE POLYMERIZATIONS

| Catalyst System | Ratio AlCl₃:RxSnXy | Catalyst, percent | Yield Resin | Yield Oil | Soft. Pt., °C. |
|---|---|---|---|---|---|
| AlCl₃ | | 5.0 | 29.1 | 35.2 | 92 |
| AlCl₃-SnCl₄ | 5.0 | 5.0 | 33.6 | 31.9 | 79 |
| AlCl₃-(C₄H₉)SnCl₃ | 5.0 | 5.0 | 48.9 | 34.5 | 84 |
| AlCl₃-(C₄H₉)₂SnCl₂ | 2.5 | 5.0 | 85.0 | 10.0 | 130 |
| AlCl₃-(C₃H₇)₂SnCl₂ | 10.0 | 5.0 | 65.3 | 23.6 | 130 |
| AlCl₃-(C₅H₉)₂SnCl₂ | 10.0 | 5.0 | 60.1 | 23.1 | 128 |

From this table it will be observed that aluminum chloride alone or with stannic chloride is productive of alpha pinene resin of low softening point and of low yield relative to the yield of oil. The data of the table show also that dialkyl tin dichlorides are productive of resin of much higher softening point than are had with butyl tin trichloride, and that, similarly, the resin yield is greatly increased with the dichlorides whether they are the butyl, propyl or amyl compounds. The dimethyl and the dioctyl compounds may also be used.

These co-catalysts are applicable also advantageously to the polymerization of other unsaturated cyclic compounds, examples being beta pinene and vinyl cyclohexene; in the case of these compounds scrupulous drying and protection against moisture and oxygen are unnecessary. As exemplifying the polymerization of beta pinene, in one run there were used 120 grams of undried beta pinene, 180 grams of undried Solvesso 100, 2.5 grams of AlCl₃ and 0.06 gm. of DBTD. Following the procedure of the alpha pinene example, the soaking period after addition of the beta pinene was but one hour. The result, obtained as in the case of alpha pinene, was:

Yield _____ percent__ 94
Softening point _____ ° C__ 138
Color _____ G3
Chlorine _____ p.p.m__ 200

Using the same procedure without DBTD the results were:

Yield _____ percent__ 92
Softening point _____ ° C__ 134
Color _____ G3
Chlorine _____ p.p.m__ 930

The yield difference between these two runs is within the range of experimental variation but it is to be noted that the co-catalyst of this invention produced a resin of greatly reduced chlorine content as compared with the resin produced with aluminum chloride alone, which is of major significance commercially.

As a further example of the invention, 100 grams of undried vinyl cyclohexene and 100 grams of undried Solvesso 100 were treated with 4 grams of aluminum chloride and 1 gram of DBTD in the same manner as the example illustrating the treatment of alpha pinene except that the reaction was run at 50° C. and the reaction body was held for 80 minutes after the monomer was charged. The reaction mass was worked up in the same manner as in the case of alpha pinene to give an 88 percent yield of 100° C. softening point resin. For comparison, a similar run at 40° C. with 5 grams of aluminum chloride and no DBTD gave an insoluble polymer, and sludging of the catalyst occurred.

Those familiar with the polymerization art will recognize that although the invention has been exemplified with reference to individual monomers it is equally applicable to mixtures of two or more such monomers, an example being the polymerization of a turpentine fraction boiling up to 170° C. and comprising predominantly alpha and beta pinenes.

It will be understood from what has been said that unsaturated cyclic hydrocarbons, and especially bicyclic monoterpenes, are polymerized by a co-catalyst of an alkyl tin halide, preferably a dihalide, and aluminum chloride. As described, the prepared catalyst or its components may be added to the solvent followed by addition of the unsaturated cyclic hydrocarbon. Alternative procedures may be used. Thus, the hydrocarbon may be added with the tin halide to the solvent followed by addition of the AlCl₃. Or, there may be charged together the solvent and the AlCl₃, the tin halide is then dissolved in the hydrocarbon and added dropwise. In all such cases there is a solution of the co-catalysts which effects the polymerization.

Although the invention may be practiced by batch methods, continuous operation is desirable on a commercial scale. Such a system may consist of a glass three-neck reaction flask (1) with an overflow line leading to another flask (2) of the same type. The monomer is reacted in flask 1 as feed, catalyst and solvent are added continuously at appropriate rates; the reaction mass overflows to flask 2 where it is given an additional reaction time. The overflow from flask 2 goes to a quenching flask (3) where the catalysts are washed out with water. From flask 3 the usual washing and resin recovery steps are followed, as described above. The usual process variables (e.g., flow rate, catalyst ratio, etc.) may be manipulated to obtain optimum results.

In a typical continuous reaction the process is started up as in normal reverse addition batch runs, i.e. the monomer is added to a solution of solvent and catalyst. Modifications of the batch technique may also be used, e.g. adding all or a portion of the tin alkyl with the monomer. Overflow from flask 1 begins as the batch monomer addition is completed. At this point a solvent monomer-tin alkyl solution is pumped into flask 1 and the AlCl₃ is fed directly into the system. The temperature in flasks 1 and 2 is controlled at the desired point, e.g. 20–25° C., and the run may be continued indefinitely.

Among the advantages in continuous processing are (a) the elimination of the need for rapid monomer charging and the heat control problems associated with this, (b) the better control of product color and (c) a more economical method of producing large quantities of product.

The results of a typical continuous 8-hour run using 600 ml./hr., a solution of 60 percent monomer and 40 percent solvent, both by volume, containing as catalysts 5 parts of AlCl₃ and 1 part of dibutyl tin dichloride run are given below:

Resin yield _____ percent__ 70
Oil yield _____ 14
Softening point _____ ° C___ 118
Gardner color _____ 3½

The polymers provided by the invention are useful for the purposes to which beta pinene polymers are applied.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:
1. That method of polymerizing an unsaturated cyclic hydrocarbon comprising the steps of forming a solution of an alkyl tin halide and aluminum chloride in a dry inert solvent in a closed container, drying said hydrocarbon and adding it incrementally and with stirring to said solution, controlling the temperature in the liquid body at about minus 25° C. to 50° C. and continuing to do so with stirring for at least 15 minutes after the addition of said hydrocarbon, hydrolyzing the catalyst, separating the resultant hydrocarbon phase and washing it with water, then heating to drive off solvent followed by steam distilling, and recovering solid polymer of said hydrocarbon.

2. A method according to claim 1, the temperature being about 20° to 25° C.

3. A method according to claim 1, said halide being a dialkyl dichloride.

4. A method according to claim 3, said halide being dibutyl tin dichloride.

5. A method according to claim 4, said hydrocarbon being alpha pinene and said halide being dibutyl tin dichloride.

6. A method according to claim 1, said hydrocarbon being a bicyclic monoterpene.

7. A method according to claim 1, said halide being dibutyl tin dichloride, the ratio of $AlCl_3$ to said dichloride being less than about 30:1, and the dichloride plus $AlCl_3$ being present in an amount of about 5 to 7 percent by weight of said hydrocarbon.

8. That method of polymerizing an unsaturated cyclic hydrocarbon selected from the group consisting of alpha pinene, beta pinene and vinyl cyclohexene comprising the steps of forming a solution of dialkyl tin dihalide and aluminum chloride in a dry solvent in a closed container, passing a dry inert gas through the container, drying said hydrocarbon and adding it incrementally and with stirring to said solution while continuing to pass said gas, controlling the temperature in the liquid body at about minut 25° C. to plus 50° C. and continuing to do so with stirring for at least 15 minutes after the addition of said hydrocarbon, hydrolyzing the catalyst with water, separating the resultant hydrocarbon phase and washing it with water, then heating to drive off solvent followed by steam distilling, and recovering the solid polymer of said hydrocarbon.

9. That method of polymerizing a mixture of at least two cyclic unsaturated hydrocarbons comprising the steps of forming a solution of an alkyl tin halide and aluminum chloride in a dry inert solvent in a closed container, adding said hydrocarbon mixture incrementally and with stirring to said solution while controlling the temperature in the liquid body at about minus 25° C. to plus 50° C. and continuing to do with stirring for a least 15 minutes after the addition of said hydrocarbon mixture, hydrolyzing the catalyst, separating the resultant hydrocarbon phase and washing it with water, then heating to drive off solvent followed by steam distilling, and recovering solid polymer.

10. A method according to claim 9, said mixture being a turpentine fraction boiling up to 170° C.

11. That method of polymerizing an unsaturated cyclic hydrocarbon comprising the steps of continuously passing into a closed container the hydrocarbon monomer and a solution of a dialkyl tin halide and aluminum chloride in a dry solvent in a closed container, stirring the container contents and controlling the temperature in the liquid body at about mius 25° C. to plus 50° C. continuously passing the reaction body into a second container at the reaction temperature, withdrawing reaction body from the latter, hydrolyzing the catalyst with water, separating the resultant hydrocarbon phase and washing it with water, then heating to drive off solvent followed by steam distilling, and recovering the solid polymer of said hydrocarbon.

12. A cyclic unsaturated hydrocarbon co-catalyst consisting essentially of a solution of an alkyl tin halide and aluminum chloride in a dry inert solvent.

13. A catalyst according to claim 12, said halide being a dialkyl dichloride.

14. A catalyst according to claim 13, said halide being dibutyl tin dichloride.

15. A catalyst according to claim 14, said halide being dibutyl tin dichloride, and the ratio of $AlCl_3$ to said dichloride to $AlCl_3$ being less than about 30:1.

References Cited

UNITED STATES PATENTS 2,802,813   8/1957   Maguire et al. _____ 260—93.3

JOSEPH L. SCHOFER, *Primary Examiner.*

L. EDELMAN, *Assistant Examiner.*